United States Patent [19]
Koller

[11] 3,983,565
[45] Sept. 28, 1976

[54] DEVICE FOR RECORDING SPEED OPERATING CONDITIONS OF A WHEELED VEHICLE

[76] Inventor: Ernst Koller, Paradiesstrasse 64, Binningen, Switzerland, CH-4102

[22] Filed: Dec. 23, 1975

[21] Appl. No.: 643,819

[30] Foreign Application Priority Data
Dec. 27, 1974 Switzerland.................. 17274/74

[52] U.S. Cl. ............................... 346/18; 346/49
[51] Int. Cl.² .................... G01D 9/00; G01D 9/30
[58] Field of Search..................... 346/18, 33 D, 49

[56] References Cited
UNITED STATES PATENTS

| | | | |
|---|---|---|---|
| 1,256,723 | 2/1918 | Nicholson | 346/33 D |
| 1,421,390 | 7/1922 | Bosque et al. | 346/18 |
| 1,578,082 | 3/1926 | Haney | 346/33 D |
| 2,208,140 | 7/1940 | Stake | 346/49 |
| 3,383,696 | 5/1968 | Fichter | 346/49 X |
| 3,624,660 | 11/1971 | Fichter | 346/49 |
| 3,673,608 | 6/1972 | Voorman, Jr. | 346/18 |

Primary Examiner—George H. Miller, Jr.
Attorney, Agent, or Firm—McGlew and Tuttle

[57] ABSTRACT

A device for recording speed operating conditions of a wheeled vehicle having wheels on which it travels, comprises a housing having at least one speed information recording stylus, and preferably at least one excess speed information recording stylus. The housing includes a connection for obtaining information of the speed of travel of the vehicle and for imparting the information to the stylus for recording on a continuous recording medium which is moved past each stylus. A presettable arrangement is provided for indicating on the excess speed information recording stylus whenever a predetermined speed is exceeded. The recording medium is driven by a drive which may, for example, be a constant speed drive, and the medium is advantageously long enough so that it may operate for at least 10,000 km. The housing for the device is advantageously of a size of a small car radio, such as one having maximum dimensions of 8 cm in height, 20 cm in width and 30 cm in depth. The portion of the housing containing the recording medium is advantageously lockable.

7 Claims, 2 Drawing Figures

DEVICE FOR RECORDING SPEED OPERATING CONDITIONS OF A WHEELED VEHICLE

FIELD AND BACKGROUND OF THE INVENTION

This invention relates in general to devices for recording the speed of operation of a vehicle and, in particular, to a new and useful device for permanently storing information concerning the speed of the vehicle and the number of times which it has exceeded a predetermined speed, for example, during any operating trip.

DESCRIPTION OF THE PRIOR ART

The invention deals generally with devices for checking the movement of a vehicle over a trackway or road. For example, there are known tachographs for cars and motorcycles which comprise a disc on which the travel speed is recorded as a function of the time and, after a certain number of travel hours, the recording is automatically erased so that at any time only the record of the last few hours of travel is available. Such a tachograph operates only as long as the vehicle moves so that no information can be obtained during the stopped periods. Recording devices are also known for use in taxicabs and similar devices which comprise a record disc which is driven by a clock mechanism are employed. In such a case the traveling speed is recorded not only as a function of the traveling periods but also as a function of the duration of the day so that stop periods are also readable. The record disc on which further information may also be recorded, such as a mark identifying the driver, must be replaced daily.

Further known devices include tachographs for rail vehicles which comprise replaceable paper rolls on which the traveling speed, as well as other information, is recorded. The record support must be replaced by the driver and remitted to the employer or the office.

Recently, warning devices have been known which can be mounted into the motor vehicles and which deliver an optical or an acoustical signal as soon as the adjusted speed limit is exceeded. In most cases, a plurality of speed limits is preprogrammed, and any speed limit may be preselected, for example, by pushing a button. All of these known devices have a disadvantage in that their use is limited. None of them are suitable for general use. In particular, no budget priced device is available making it possible both for a careful and conscientious driver to prove his speed during the last kilometers or meters preceding distances upon which an accident occurs. Nor are such devices available to police and, for any driver, to check the manner of driving or checking the manner in which other users of the vehicle have driven the vehicle.

SUMMARY OF THE INVENTION

In accordance with the present invention, there is provided a checking apparatus for road motor vehicles which is provided with a housing for a warning device wherein, upon exceeding a predetermined speed, a signal is transmitted which may be recorded on a movable medium along with general information of the continuous operating speed, for example. With the inventive arrangement, the recording medium advantageously comprises a wire or a tape which may be moved, for example, between two reels, for a period of time equivalent to a vehicle travel of 10,000 km or more. The device of the invention may be made small in weight and of the size of a car radio or smaller and is advantageously 8 cm in height, 20 cm in width and 30 cm in depth. The recording medium is advantageously contained in a portion of the housing which may be locked so that the information recorded may be preserved.

Accordingly, it is an object of the invention to provide an improved device for recording information of the operating speed of a vehicle, for example, during the entire time of its operation over one or more trips, and for also indicating those times in which speed over a certain amount has taken place.

A further object of the invention is to provide a device for recording or checking upon the operating conditions of a motor vehicle and particularly the speed of operation which includes presettable means for indicating during the recorded time of travel of the vehicle when a speed has been exceeded and which is accommodated in a housing or receptacle having maximum dimensions less than a height of 8 cm, a width of 20 cm and a depth of 30 cm.

A further object of the invention is to provide a device for recording speed travel information which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
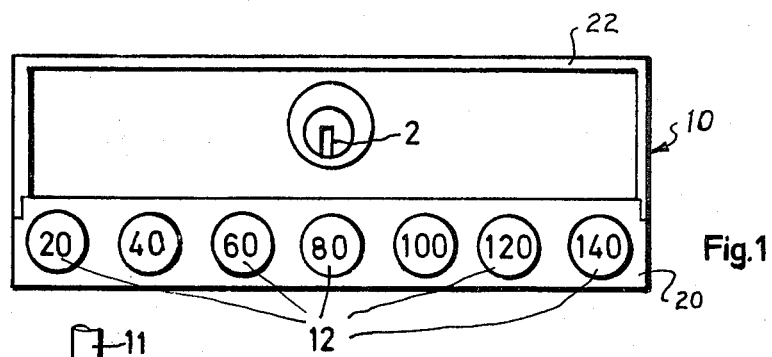
FIG. 1 is a front elevational view of a device for recording vehicle speed information constructed in accordance with the invention.
Figure 2:
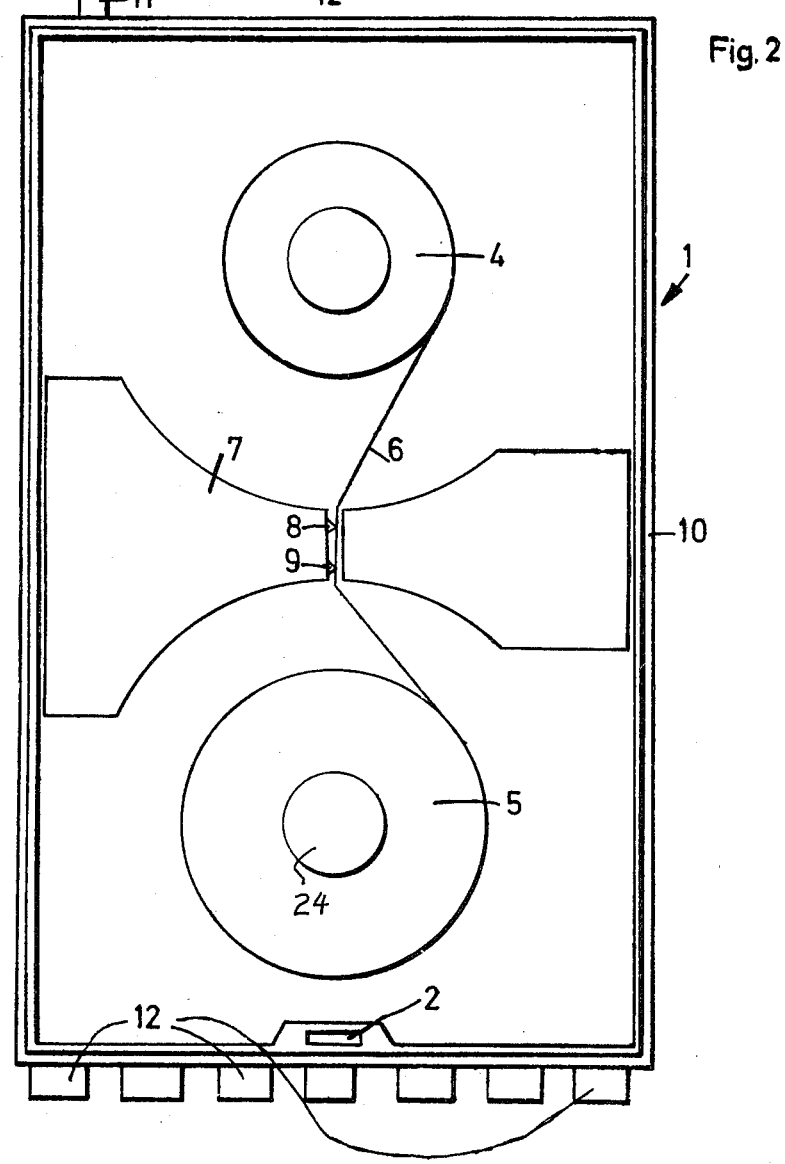
FIG. 2 is a top plan view of the device shown in FIG. 1, but with the cover removed.

Referring to the drawing in particular, the invention embodied therein, comprises a speed information and warning device, generally designated 1, which is dimensioned preferably in accordance with the standard dimensions of car radios and advantageously has a width of 18 cm, a height of 6.4 cm and a depth of approximately 16 cm. The apparatus may be somewhat larger, however, but a height of 8 cm, a width of 20 cm and a depth of 30 cm should not be exceeded.

In accordance with the invention, the housing 10 includes a lower portion 20 and a top cover 22 which may be locked over the bottom portion 20 by means of a key-operated lock mechanism 2. The electrical component parts for the device are advantageously contained in bottom portion 20 and they include electrical means for indicating the speed of movement of the vehicle as a result of the transmission of this information to the device through a rotatable shaft 11.

In accordance with a feature of the invention, a recording medium 6, such as a tape or wire, is trained to run between reels 4 and 5, preferably at a constant speed under the influence of a drive motor 24 which, for example, may be on the top or bottom of reel 5. The top part of the housing accommodates a recording mechanism 7 disposed between the two reels 4 and 5 which includes at least one first recording stylus 8 for recording general speed information over an operating period of the vehicle and at least 1 second recording stylus 9 for recording extraordinary speed information, for example, when the speed in excess of a predetermined amount has been reached. Recording medium 6 is advanced past the styluses 8 and 9 and either one or both styluses may be placed in operation for example when the device is turned on at the beginning of a trip. Styluses 8 and 9 are connected through the electrical mechanism of the housing to the shaft 11 for indicating particular speed information which may be recorded on the medium as it is advanced thereby.

The medium is advanced at a constant speed by the drive mechanism 24 which, for example, may include means for accommodating for changes in diameter of the spools during the driving operation. Alternatively, a timer is provided for effecting a deflection of at least one of the styluses, for example, the second stylus, at regular intervals of time or upon the occurrence of a certain speed condition, for example. For example, stylus 9 may be deflected during every five or ten minutes of operation of the device so as to record on the medium 6. An isochronal advance may be provided which causes advance in proportion to the covered distance of the vehicle, for example, the medium may advance at the rate of 8 mm per km of distance travelled. The take-up mechanism would be connected to the drive motor only through a slip coupling in such event so that the motor only winds up the recording medium 6 without influencing the rate of advance.

In accordance with a feature of the invention, the record tape or recording medium 6 is at least long enough to provide for recording over a 10,000 km distance of travel of the vehicle. In a well known manner, shaft 11 which is connected to the motor drive for the vehicle actuates a rotational speed device for effecting a displacement of stylus 8 from the rest position into a position at which it records the traveling speed continuously.

Presettable means in the form of seven select buttons or pushbuttons 12 are provided for effecting the recording of information when a predetermined speed has been exceeded. For such purpose, a button is deflected comparable to the speed which is to be indicated in the continuous record and this effects displacement of stylus 9 into engagement with recording medium 6 every time the speed has been exceeded and recording is effected during all of this time. Pushbuttons 12 are advantageously designed as luminous elements connected so that, for the setting of a predetermined speed, the respective pushbutton is pressed and the button is illuminated upon reaching the preselected speed.

While a specific embodiment of the invention has been shown and described in detail to illustrate the application of the principles of the invention, it will be understood that the invention may be embodied otherwise without departing from such principles.

What is claimed is:

1. A device for recording speed operating conditions of a vehicle, having means such as a wheel on which it travels over the ground, comprising a housing, at least one first speed information recording stylus, a connection on said housing for connecting said first speed information recording stylus to the wheel for indicating the speed of travel of the vehicle, a continuous recording medium movable past the stylus for receiving the recording of the speed of travel of the vehicle, at least one second excess speed information recording stylus located adjacent the recording medium, speed settable means connectable to said second stylus and said connection to actuate said second stylus to record excess speed information on said medium when the speed which has been set on said settable means is exceeded, and drive means connected to said medium to move said medium at a predetermined speed.

2. A device for recording speed operating conditions of a vehicle, according to claim 1, wherein said settable means delivers a signal, said housing having a maximum of a height of 8 cm, a width of 20 cm and a depth of 30 cm.

3. A device for recording speed operating conditions of a vehicle, according to claim 1, wherein said housing includes a portion enclosing the recording medium having a key-operated lock.

4. A device for recording speed operating conditions of a vehicle, according to claim 1, wherein said settable means comprises a plurality of pushbuttons each having an individual speed setting which may be pushed to effect the recording on said second speed information recording stylus.

5. A device for recording speed operating conditions of a vehicle, according to claim 1, wherein said means for moving said medium comprises a drive motor for moving said medium at a speed of at least 8 mm per km of vehicle travel.

6. A device for recording speed operating conditions of a vehicle, according to claim 1, wherein said housing comprises a rectangular housing having a front with a plurality of buttons thereon which are depressable and which contain selected speed indications thereon, said front being constructed to be incorporated in the vehicle dashboard.

7. A device for recording speed operating conditions of a vehicle, according to claim 1, wherein said housing is of a height comparable to the standard car radio dimensions.

* * * * *